US012690041B2

(12) United States Patent
Gui et al.

(10) Patent No.: US 12,690,041 B2
(45) Date of Patent: Jul. 21, 2026

(54) METHOD FOR DETERMINING NUMBER OF BITS, ELECTRONIC DEVICE, AND STORAGE MEDIUM

(71) Applicant: BEIJING UNISOC COMMUNICATIONS TECHNOLOGY CO., LTD., Beijing (CN)

(72) Inventors: Xin Gui, Beijing (CN); Yuhua Wang, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 308 days.

(21) Appl. No.: 18/559,855

(22) PCT Filed: May 10, 2022

(86) PCT No.: PCT/CN2022/091994
§ 371 (c)(1),
(2) Date: Nov. 9, 2023

(87) PCT Pub. No.: WO2022/237783
PCT Pub. Date: Nov. 17, 2022

(65) Prior Publication Data
US 2024/0244625 A1 Jul. 18, 2024

(30) Foreign Application Priority Data
May 10, 2021 (CN) .......................... 202110508437.6

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04W 72/11* (2023.01); *H04W 72/232* (2023.01); *H04W 72/30* (2023.01)

(58) Field of Classification Search
CPC . H04L 1/16; H04L 1/1607; H04L 1/18; H04L 1/1812; H04L 1/1854;
(Continued)

(56) References Cited

U.S. PATENT DOCUMENTS

2020/0106566 A1* 4/2020 Yeo ........................ H04L 1/1812
2021/0250918 A1* 8/2021 Liu ........................ H04W 72/20
(Continued)

FOREIGN PATENT DOCUMENTS

CN 109474391 A 3/2019
CN 111835480 A 10/2020
CN 112073158 A 12/2020

OTHER PUBLICATIONS

WIPO, International Search Report and Written Opinion for International Application No. PCT/CN2022/091994, Jun. 28, 2022.

*Primary Examiner* — Kashif Siddiqui
(74) *Attorney, Agent, or Firm* — JCIPRNET

(57) ABSTRACT

Provided is a method for determining a number of bits, an electrical device, and a storage medium. The method includes the following. Obtain service information of a first service and service information of a second service, where the first service and the second service are carried in the same physical uplink control channel (PUCCH). Obtain the number of bits of hybrid automatic repeat request (HARQ) feedback information of the PUCCH according to configuration information, the service information of the first service, and the service information of the second service, where the configuration information is used for recording a
(Continued)

OBTAIN SERVICE INFORMATION OF FIRST SERVICE AND SERVICE INFORMATION OF SECOND SERVICE /201

OBTAIN THE NUMBER OF BITS OF HARQ FEEDBACK INFORMATION OF PUCCH ACCORDING TO CONFIGURATION INFORMATION, SERVICE INFORMATION OF FIRST SERVICE, AND SERVICE INFORMATION OF SECOND SERVICE /202 configuration parameter for a channel for transmitting the
first service and the second service.

20 Claims, 5 Drawing Sheets

(51) Int. Cl.
    *H04W 72/11*       (2023.01)
    *H04W 72/232*    (2023.01)
    *H04W 72/30*     (2023.01)

(58) Field of Classification Search
    CPC ... H04L 1/1861; H04L 1/1864; H04L 1/1896;
                    H04W 72/11; H04W 72/21; H04W
                              72/232; H04W 72/30
    See application file for complete search history.

(56)                 References Cited

U.S. PATENT DOCUMENTS

| | | | |
|---|---|---|---|
| 2022/0046591 A1* | 2/2022 | Miao | H04W 72/0446 |
| 2022/0231818 A1* | 7/2022 | Lee | H04L 5/0098 |
| 2022/0346118 A1* | 10/2022 | Wu | H04L 1/1819 |
| 2022/0360360 A1* | 11/2022 | Awadin | H04W 8/24 |
| 2023/0133506 A1* | 5/2023 | Wang | H04L 1/1812 |

* cited by examiner

| | |
|---|---|
| OBTAIN SERVICE INFORMATION OF FIRST SERVICE AND SERVICE INFORMATION OF SECOND SERVICE | 201 |
| OBTAIN THE NUMBER OF BITS OF HARQ FEEDBACK INFORMATION OF PUCCH ACCORDING TO CONFIGURATION INFORMATION, SERVICE INFORMATION OF FIRST SERVICE, AND SERVICE INFORMATION OF SECOND SERVICE | 202 |

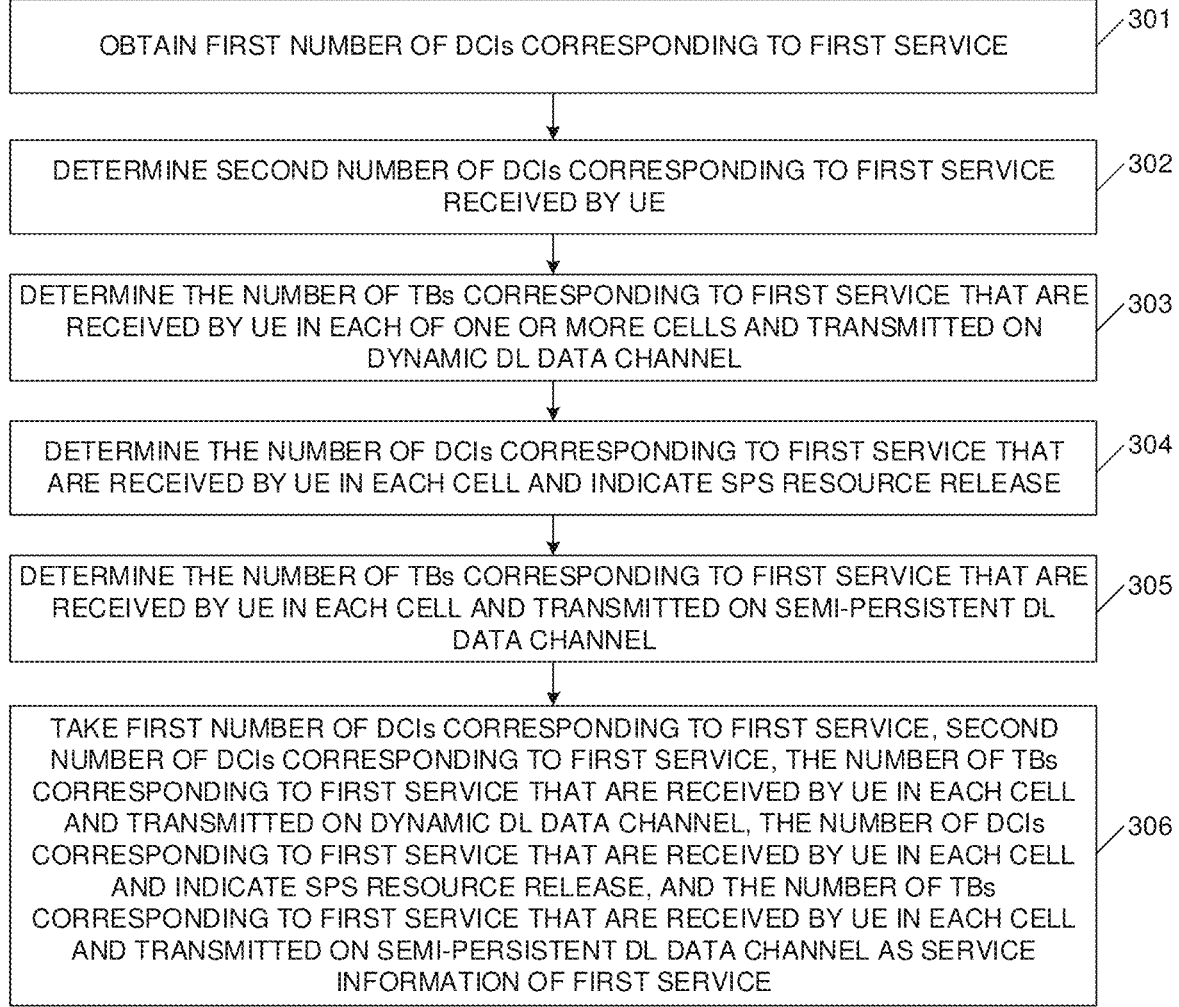

OBTAIN FIRST NUMBER OF DCIs CORRESPONDING TO FIRST SERVICE ⟍301

DETERMINE SECOND NUMBER OF DCIs CORRESPONDING TO FIRST SERVICE RECEIVED BY UE ⟍302

DETERMINE THE NUMBER OF TBs CORRESPONDING TO FIRST SERVICE THAT ARE RECEIVED BY UE IN EACH OF ONE OR MORE CELLS AND TRANSMITTED ON DYNAMIC DL DATA CHANNEL ⟍303

DETERMINE THE NUMBER OF DCIs CORRESPONDING TO FIRST SERVICE THAT ARE RECEIVED BY UE IN EACH CELL AND INDICATE SPS RESOURCE RELEASE ⟍304

DETERMINE THE NUMBER OF TBs CORRESPONDING TO FIRST SERVICE THAT ARE RECEIVED BY UE IN EACH CELL AND TRANSMITTED ON SEMI-PERSISTENT DL DATA CHANNEL ⟍305

TAKE FIRST NUMBER OF DCIs CORRESPONDING TO FIRST SERVICE, SECOND NUMBER OF DCIs CORRESPONDING TO FIRST SERVICE, THE NUMBER OF TBs CORRESPONDING TO FIRST SERVICE THAT ARE RECEIVED BY UE IN EACH CELL AND TRANSMITTED ON DYNAMIC DL DATA CHANNEL, THE NUMBER OF DCIs CORRESPONDING TO FIRST SERVICE THAT ARE RECEIVED BY UE IN EACH CELL AND INDICATE SPS RESOURCE RELEASE, AND THE NUMBER OF TBs CORRESPONDING TO FIRST SERVICE THAT ARE RECEIVED BY UE IN EACH CELL AND TRANSMITTED ON SEMI-PERSISTENT DL DATA CHANNEL AS SERVICE INFORMATION OF FIRST SERVICE ⟍306

FIG. 3

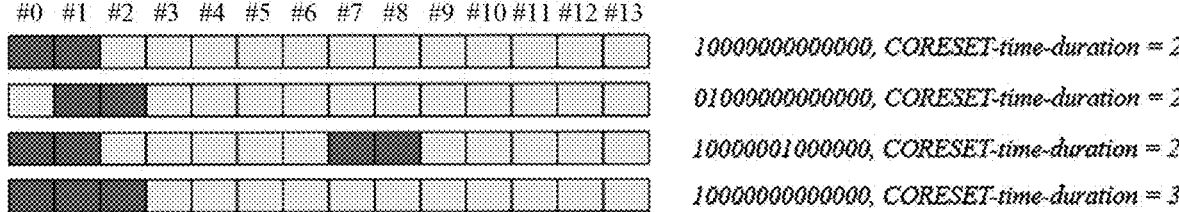

0  #1  #2  #3  #4  #5  #6  #7  #8  #9 #10 #11 #12 #13

*10000000000000, CORESET-time-duration = 2*
*01000000000000, CORESET-time-duration = 2*
*10000001000000, CORESET-time-duration = 2*
*10000000000000, CORESET-time-duration = 3*

FIG. 4

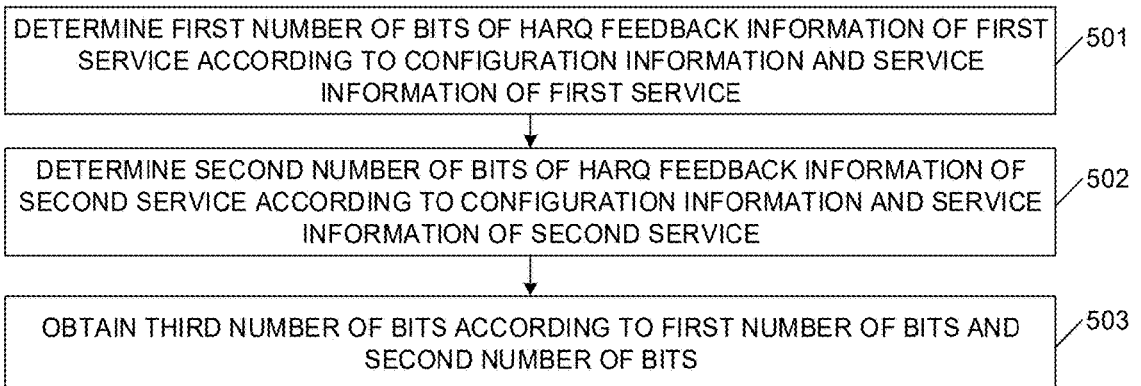

| DETERMINE FIRST NUMBER OF BITS OF HARQ FEEDBACK INFORMATION OF FIRST SERVICE ACCORDING TO CONFIGURATION INFORMATION AND SERVICE INFORMATION OF FIRST SERVICE | 501 |

| DETERMINE SECOND NUMBER OF BITS OF HARQ FEEDBACK INFORMATION OF SECOND SERVICE ACCORDING TO CONFIGURATION INFORMATION AND SERVICE INFORMATION OF SECOND SERVICE | 502 |

| OBTAIN THIRD NUMBER OF BITS ACCORDING TO FIRST NUMBER OF BITS AND SECOND NUMBER OF BITS | 503 |

FIG. 5

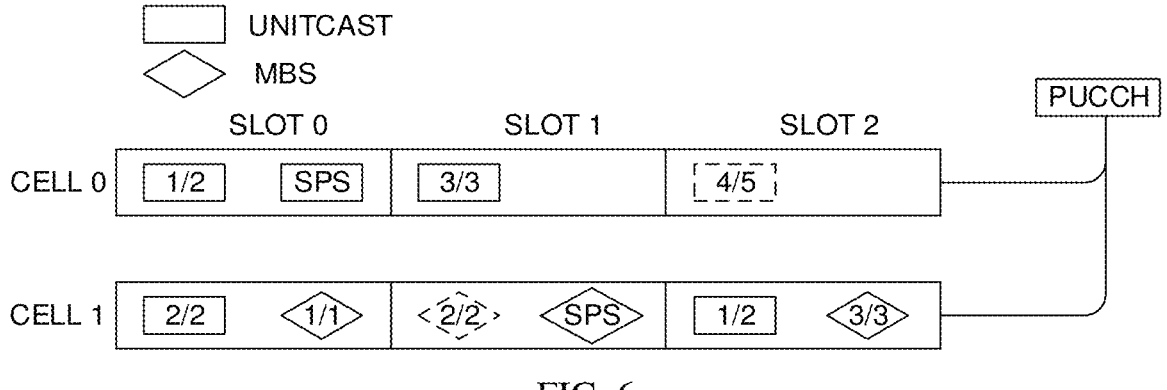
FIG. 6
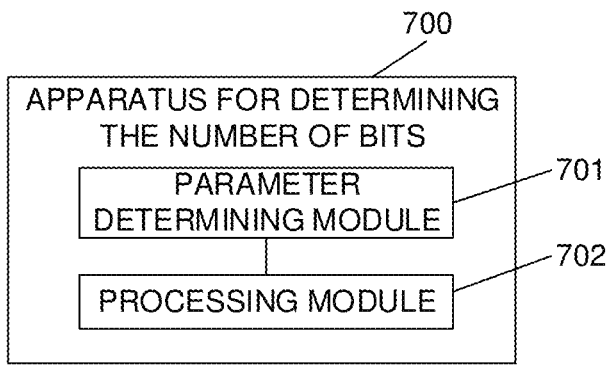
FIG. 7
FIG. 8

METHOD FOR DETERMINING NUMBER OF BITS, ELECTRONIC DEVICE, AND STORAGE MEDIUM

CROSS-REFERENCE TO RELATED APPLICATION(S)

This application is a National Stage of International Application No. PCT/CN2022/091994, filed May 10, 2022, which claims priority to Chinese patent application No. 202110508437.6, filed to the Chinese Patent Office on May 10, 2021, the entire disclosures of which are hereby incorporated by reference.

TECHNICAL FIELD

The disclosure relates to the field of communication technology, and more particularly, to a method for determining a number of bits, an electronic device, and a storage medium.

BACKGROUND

At present, for calculation of a transmission power of a physical uplink control channel (PUCCH), it is necessary to obtain the number (that is, quantity) of bits of hybrid automatic repeat request (HARQ) feedback information of the PUCCH. In this regard, currently, for determining the number of bits of the HARQ feedback information, only the case where only unicast service exists on the PUCCH is considered in a protocol.

However, in a 5<sup>th</sup> generation (5G) standard release 17 (Rel-17), a multicast or broadcast service (MBS) is introduced. An MBS service and a conventional unicast service may coexist, and may be transmitted on the same PUCCH resource. Therefore, after introduction of the 5G standard Rel-17, multiplexing of multiple service types on the same PUCCH may occur, for example, an MBS and a unicast service are multiplexed on the same PUCCH. However, an existing protocol for determining the number of bits of HARQ feedback information cannot be applied to determination of the number of bits of HARQ feedback information in such a case.

SUMMARY

In a first aspect, a method for determining a number of bits is provided in embodiments of the disclosure. The method includes the following. Obtain service information of a first service and service information of a second service, where the first service and the second service are carried in the same PUCCH. Obtain a number of bits of HARQ feedback information carried on the PUCCH according to configuration information, the service information of the first service, and the service information of the second service, where the configuration information is used for recording a configuration parameter for a channel for transmitting the first service and the second service.

In a second aspect, an electronic device is provided in embodiments of the disclosure. The electronic device includes a processor and a memory. The processor is coupled with the memory. The memory is configured to store computer programs. The processor is configured to execute the computer programs stored in the memory, to cause the electronic device to perform the method in the first aspect.

In a third aspect, a non-transitory computer-readable storage medium is provided in embodiments of the disclosure. The computer-readable storage medium is configured to store computer programs which are operable with a computer to perform the method in the first aspect.

BRIEF DESCRIPTION OF THE DRAWINGS

In order to describe more clearly technical solutions of embodiments of the disclosure, the following will give a brief introduction to the accompanying drawings used for describing the embodiments. Apparently, the accompanying drawings described below are some embodiments of the disclosure. Based on these drawings, those of ordinary skill in the art can also obtain other drawings without creative effort.

FIG. 3 is a schematic flowchart of a method for obtaining service information of a first service provided in embodiments of the disclosure.

FIG. 4 is a schematic diagram illustrating a monitoring timing provided in embodiments of the disclosure.

FIG. 5 is a schematic flowchart of a method for obtaining the number of bits of hybrid automatic repeat request (HARQ) feedback information of a physical uplink control channel (PUCCH) according to configuration information, service information of a first service, and service information of a second service provided in embodiments of the disclosure.

FIG. 6 is a schematic diagram illustrating transmission by multiplexing a multicast or broadcast service (MBS) and a unicast service on the same PUCCH provided in embodiments of the disclosure.

FIG. 7 is a block diagram illustrating functional modules of an apparatus for determining the number of bits provided in embodiments of the disclosure.

FIG. 8 is a schematic structural diagram of an electronic device provided in embodiments of the disclosure.

DETAILED DESCRIPTION

The following will describe technical solutions of embodiments of the disclosure clearly and completely with reference to the accompanying drawings of the embodiments of the disclosure. Apparently, the embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

The terms "first", "second", "third", and "fourth", etc. in the specification and claims of the disclosure and the accompanying drawings are used to distinguish different objects, and are not necessarily used to describe a particular order. In addition, the terms "include", "comprise", and "have" as well as variations thereof are intended to cover non-exclusive inclusion. For example, a process, method, system, product, or device including a series of steps or units is not limited to the listed steps or units, and instead, it can optionally include other steps or units that are not listed or other steps or units inherent to the process, method, product, or device.

The term "embodiment" referred to in the disclosure means that a particular feature, structure, or characteristic described in conjunction with the embodiment may be contained in at least one embodiment of the disclosure. The phrase appearing in various places in the specification does not necessarily refer to the same embodiment, nor does it refer to an independent or alternative embodiment that is mutually exclusive with other embodiments. It is explicitly and implicitly understood by those skilled in the art that an embodiment described herein may be combined with other embodiments.

Figures 1, 2:
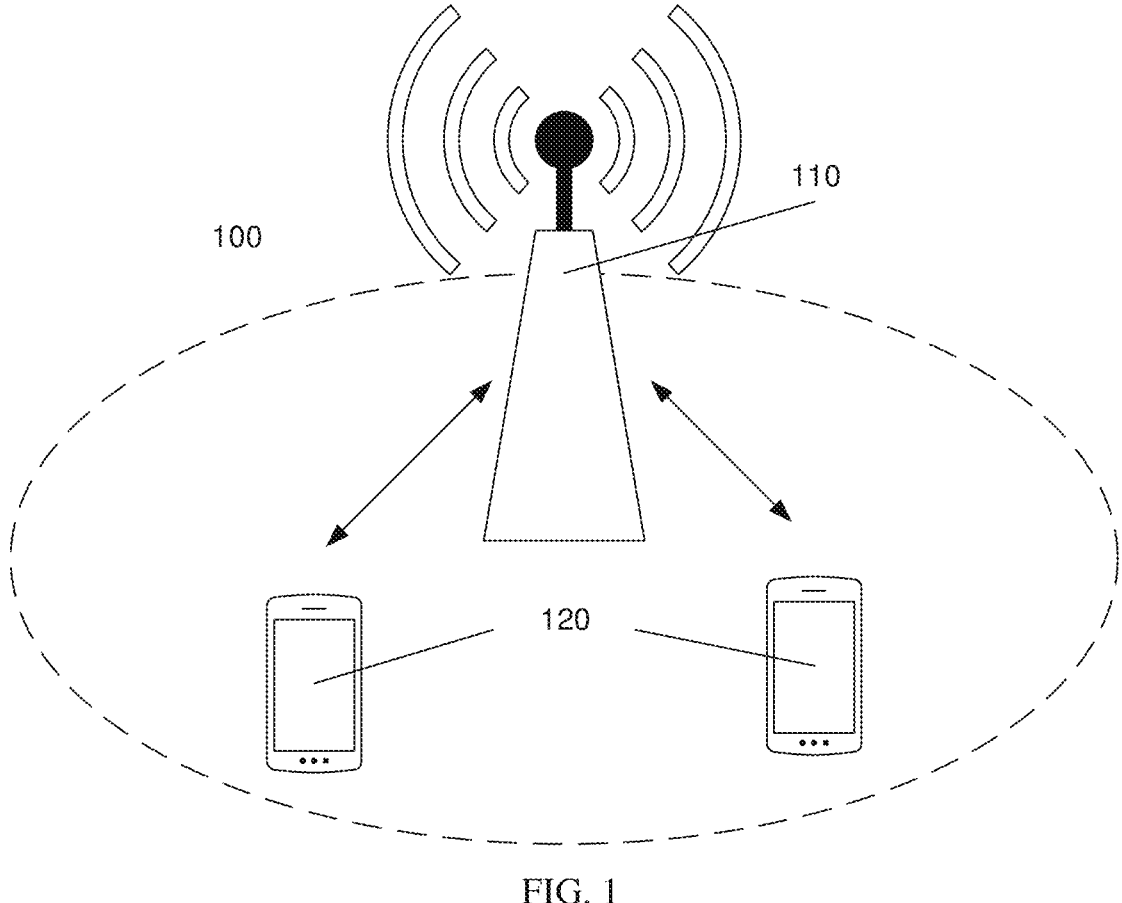
FIG. 1 is a network architectural diagram of a communication system provided in embodiments of the disclosure.
FIG. 2 is a schematic flowchart of a method for determining the number of bits provided in embodiments of the disclosure.

Referring to FIG. 1, FIG. 1 is a network architectural diagram of a communication system involved in the disclosure. The communication system 100 may be a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, or a 5th-generation (5G) communication system, etc.

Exemplarily, the communication system 100 may include a network device 110. The network device 110 may be a device for communicating with a terminal 120 (also referred to as "communication terminal" or "terminal"). The network device 110 can provide a communication coverage for a specific geographical area and communicate with terminal(s) in the coverage area. Optionally, the network device 110 may be a base transceiver station (BTS) in a GSM or a CDMA system, or may be a NodeB (NB) in a WCDMA system, or may be an evolutional Node B (eNB or eNodeB) in an LTE system, or a radio controller in a cloud radio access network (CRAN); or the network device may be a mobile switching center, a relay station, an access point, an in-vehicle device, a wearable device, a hub, a switch, a bridge, a router, a network-side device in a 5G network, or a network device in a future evolved public land mobile network (PLMN), etc.

The communication system 100 further includes at least one terminal 120 within coverage of the network device 110. In the embodiments, the terminal 120 may be a device configured to communicate via a wired line, another data/network connection, a wireless interface, an apparatus which is part of another terminal and configured to receive/transmit communication signals, and/or an Internet of things (IoT). Examples of the wired line may include a public switched telephone network (PSTN), a digital subscriber line (DSL), a digital cable, a direct connection cable. Examples of the wireless interface may include a wireless interface for a cellular network, a wireless local area network (WLAN), a digital television network (such as a digital video broadcasting-handheld (DVB-H) network), a satellite network, an amplitude modulation-frequency modulation (AM-FM) broadcast transmitter.

A terminal connected via a wireless interface may be referred to as a "wireless communication terminal", a "wireless terminal", or a "mobile terminal". The mobile terminal may include, but are not limited to, a satellite telephone or cellular telephone, a personal communication system (PCS) terminal integrated with functions of cellular radio telephone, data processing, fax, and data communication, a personal digital assistant (PDA) equipped with radio telephone, pager, Internet/Intranet access, web browser, notebook, calendar, and/or global positioning system (GPS) receiver, and a conventional laptop, a handheld receiver, or other electronic devices equipped with radio telephone transceiver.

In addition, in the embodiments, the terminal may also refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, and various devices with wireless communication functions such as a handheld device, a computing device, other processing devices coupled with a wireless modem, an in-vehicle device, a wearable device, a terminal device in a 5G network, a terminal device in a future evolved PLMN, etc.

In an optional implementation, the terminals 120 can communicate with each other through device to device (D2D) communication.

In an optional implementation, the 5G system or 5G network may also be referred to as a new radio (NR) system or NR network.

Exemplarily, FIG. 1 illustrates the communication system 100 that includes one network device 110 and two terminals 120, but does not constitute limitation on the architecture of the communication system 100. The communication system 100 may also include multiple network devices 110, and there can be other quantities of terminals in a coverage area of each of the network devices, and the disclosure is not limited in this regard.

In an optional implementation, the communication system 100 may further include other network entities such as a network controller and a mobility management entity, and the disclosure is not limited in this regard.

It should be understood that, in the embodiments of the disclosure, a device with communication functions in a network/system can be referred to as a "communication device". Taking the communication system 100 illustrated in FIG. 1 as an example, the communication device may include the network device 110 and the terminal(s) 120 that have communication functions. The network device 110 and the terminal(s) 120 can be the devices described above and will not be described in detail again herein. The communication device may further include other devices such as a network controller, a mobility management entity, or other network entities in the communication system 100, and the disclosure is not limited in this regard.

A method for determining the number of bits disclosed in the disclosure will be described below, taking a UE as the terminal 120.

The proper nouns and abbreviations involved in the disclosure are firstly described. PUCCH: physical uplink control channel. HARQ-ACK: hybrid automatic repeat request-acknowledgement, i. e. HARQ feedback information. UE: user equipment. DCI: downlink control information. URLLC: ultra-reliable low latency communication. MBS: multi-cast or broadcast service. PDSCH: physical downlink shared channel. SPS PDSCH: semi-persistent scheduling PDSCH. DAI: downlink assignment indicator.

It should be noted that, in the embodiments, a method for determining the number of bits disclosed in the disclosure will be described by taking the case where two services are multiplexed on the same PUCCH as an example. For the case where multiple services are multiplexed on the same PUCCH, for example, three services are multiplexed on the same PUCCH, four services are multiplexed on the same PUCCH, etc., the method for determining the number of bits is similar to the method for determining the number of bits for the case where two services are multiplexed on the same PUCCH, which will not be described in detail herein.

Referring to FIG. 2, FIG. 2 is a schematic flowchart of a method for determining the number (that is, quantity) of bits provided in embodiments of the disclosure. The method includes the following steps.

201, obtain service information of a first service and service information of a second service.

In the embodiments, the first service and the second service are carried in the same PUCCH, in other words, feedback regarding DCI corresponding to the first service and DCI corresponding to the second service (i. e. DCI feedback) is multiplexed over the same PUCCH. In addition, the first service and the second service may be services of the same type or may be services of different types. For example, the first service may be a unicast service, and the second service may also be a unicast service. Alternatively, the first service may be a unicast service, and the second service may be an MBS. Alternatively, the first service may be an MBS, and the second service may also be an MBS.

In the embodiments, the PUCCH may correspond to one or more cells. Based on this, a method for obtaining the service information of the first service is provided in the embodiments. The method includes the following: obtaining service information of a first service and service information of a second service, wherein the first service and the second service are carried in the same physical uplink control channel (PUCCH); and obtaining the number of bits of hybrid automatic repeat request (HARQ) feedback information of the PUCCH according to configuration information, the service information of the first service, and the service information of the second service, wherein the configuration information is used for recording a configuration parameter for a channel for transmitting the first service and the second service.

The method is detailed below with reference to FIG. 3.

301, obtain a first number (that is, quantity) of DCIs corresponding to the first service.

In the embodiments, feedback regarding each of the DCIs of the first number is performed over the PUCCH, that is, feedback regarding the DCIs of the first number are multiplexed on the same PUCCH.

Since DCI for a unicast service is scrambled by a cell-radio network temporary identifier (C-RNTI), while DCI for an MBS is scrambled by a group-RNTI (G-RNTI), a scrambling parameter for a unicast service and a scrambling parameter for an MBS are different. In addition, even for the same service, scrambling parameters for different sub-services are different, for example, a scrambling parameter for unicast sub-service 1 is A, and a scrambling parameter for unicast sub-service 2 is B, where A is different from B.

Based on this, in the embodiments, a first parameter (namely, scrambling parameter) corresponding to each DCI can be obtained by obtaining all DCIs for which feedback is performed over the same PUCCH and descrambling each of all the DCIs. Then, the first parameter corresponding to each DCI is compared with a scrambling parameter for the first service, and if the two are the same, it indicates that the corresponding DCI is the DCI corresponding to the first service. As such, it is possible to find the DCI(s) corresponding to the first service from all the DCIs, and then count the number thereof to obtain the first number.

In an optional implementation, after obtaining all the DCIs for which feedback is performed over the same PUCCH, all the DCIs may be sorted in an order of time, and the DCIs in the sequence are descrambled sequentially from the last DCI to the 1$^{st}$ DCI until the DCI corresponding to the first service is found, where the DCI is the last DCI for the first service for which feedback is performed over the PUCCH. The first number can be obtained by extracting the value of a counter DAI in the DCI, i. e. the first number of DCIs corresponding to the first service is equal to the value of a DAI in the last DCI for the first service for which feedback is performed over the PUCCH. Specifically, if the PUCCH corresponds to a single cell, the DAI is the counter DAI, and if the PUCCH corresponds to multiple cells, the DAI is a total DAI. As such, it is possible to obtain quickly the first number of DCIs corresponding to the first service, thereby improving efficiency in determining the number of bits.

302, determine a second number of DCIs corresponding to the first service received by a UE.

Likewise, feedback regarding each of the DCIs of the second number is performed over the PUCCH, that is, feedback regarding the DCIs of the second number are multiplexed on the same PUCCH. In addition, a method for determining the second number of DCIs corresponding to the first service received by the UE is similar to the method for obtaining the first number of DCIs corresponding to the first service in step 301, which will not be described in detail herein.

For a PUCCH corresponding to multiple cells, in an optional implementation, the second number of DCIs corresponding to the first service received by the UE can be obtained by determining the number of DCIs corresponding to the first service received by the UE for which feedback is performed at each cell corresponding to the PUCCH, and then summing the number of DCIs corresponding to the first service for which feedback is performed at each cell.

Specifically, the second number of DCIs corresponding to the first service received by the UE may be represented by formula ①:

$$U_{DAI} = \sum_{c=0}^{N_{cells}^{DL}-1} U_{DAI,c} \qquad ①$$

$U_{DAI,\ c}$ represents the number of DCIs corresponding to the first service received by the UE for which feedback is performed at cell c, and $$N_{cells}^{DL}$$

represents the number of cells in the PUCCH.

303, determine the number of transport blocks (TBs) corresponding to the first service that are received by the UE in each of the one or more cells and transmitted on a dynamic downlink (DL) data channel.

304, determine the number of DCIs corresponding to the first service that are received by the UE in each cell and indicate SPS resource release.

In the embodiments, the sum of the number of TBs corresponding to the first service that are received by the UE in each cell and transmitted on a dynamic DL data channel in step 303 and the number of DCIs corresponding to the first service that are received by the UE in each cell and indicate SPS resource release in step 304 may be regarded as the total number of TBs corresponding to the first service that are received by the UE in a time period in which $1^{st}$ DCI to last DCI from the same PUCCH are received.

Exemplarily, the time period may be divided into multiple slots, and each slot can be configured with some monitoring occasion(s), so as to detect, in the slot, the number of TBs corresponding to the first service received by the UE from the PUCCH. Specifically, monitoring in a certain slot can be realized by configuring a monitoring timing. For example, FIG. 4 is a schematic diagram illustrating a monitoring timing. As illustrated in FIG. 4, the monitoring timing consists of fourteen bits that correspond to fourteen symbols, the value of 1 in the timing indicates one monitoring occasion, and the value of CORESET-time-duration is a monitoring duration.

Therefore, the number of TBs corresponding to the first service received by the UE from the PUCCH in the time period can be obtained by obtaining the number of TBs corresponding to the first service received by the UE from the PUCCH that are monitored in each monitoring occasion m, and then summing the numbers corresponding to all the monitoring occasions.

Specifically, the number of TBs corresponding to the first service received by the UE from the PUCCH in each cell may be represented by formula ②:

$$N_{k,c} + N_{y,c} = N_{q,c} = \sum_{m=0}^{M-1} N_{m,c}^{received} \qquad ②$$

$N_{k,c}$ represents the number of TBs corresponding to the first service that are received by the UE in cell c and transmitted on a dynamic DL data channel, $N_{y,c}$ represents the number of DCIs corresponding to the first service that are received by the UE in cell c and indicate SPS resource release, $N_{q,c}$ represents the number of TBs corresponding to the first service received by the UE from the PUCCH in cell c, M represents the total number of monitoring occasions, and $$N_{m,c}^{received}$$

represents the number of TBs corresponding to the first service received by the UE from the PUCCH that are monitored in monitoring occasion m.

305, determine the number of TBs corresponding to the first service that are received by the UE in each cell and transmitted on a semi-persistent DL data channel.

In the embodiments, a method for determining the number of TBs corresponding to the first service that are received by the UE in each cell and transmitted on a semi-persistent DL data channel is similar to the method for obtaining the first number of DCIs corresponding to the first service in step 301, which will not be described in detail herein.

306, take the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent DL data channel as the service information of the first service.

In the embodiments, a method for determining the service information of the second service is similar to the method for determining the service information of the first service in step 301 to step 306, which will not be described in detail herein.

202, obtain the number of bits of HARQ feedback information carried on the PUCCH according to configuration information, the service information of the first service, and the service information of the second service.

In the embodiments, the configuration information is used for recording a configuration parameter for a channel for transmitting the first service and the second service. Exemplarily, the configuration information may include configuration information for the PUCCH and configuration information for a PDSCH.

In the embodiments, a method for obtaining the number of bits of the HARQ feedback information carried on the PUCCH according to the configuration information, the service information of the first service, and the service information of the second service is provided. As illustrated in FIG. 5, the method includes the following.

501, determine a first number (that is, quantity) of bits of HARQ feedback information of the first service according to the configuration information and the service information of the first service.

In the embodiments, a bit width of first indication information of the DCI for which feedback is performed over the PUCCH is firstly determined according to the configuration information for the PUCCH in the configuration information. The first indication information, for example, a counter DAI field in DCI, is indication information used for indicating an accumulative number of DCIs received by the UE and having different data contents and/or an accumulative number of DCIs indicating DL SPS resource release.

Then, a maximum number of code words of a first configuration is determined according to a first source corresponding to the first service in the configuration information. In the embodiments, the first source may be configuration information for a PDSCH (PDSCH-config), and the first configuration may be configured via maxNrofCodeWordsScheduledByDCL. PDSCH-config is PDSCH-config corresponding to the first service. Exemplarily, if the first service is a unicast service, PDSCH-config corresponding to the first service is a common PDSCH-config; and if the first service is an MBS, PDSCH-config corresponding to the first service is a GC-PDSCH-config.

After the above two parameters are determined, the first number of bits of the HARQ feedback information of the first service may be represented by formula ③:

$$n_{HARQ-ACK,1} = \left( (V_{DAI,m_{last}}^{DL} - U_{DAI}) \bmod (2^x) \right) N_{TB,max}^{DL} + \sum_{c=0}^{N_{cells}^{DL}-1} (N_{k,c} + N_{y,c} + N_{sps,c}) \qquad ③$$

x represents the bit width, $$N_{TB,max}^{DL}$$

represents the maximum number of code words, $$V_{DAI,m_{last}}^{DL}$$

represents the first number of DCIs corresponding to the first service, $U_{DAI}$ represents the second number of DCIs corresponding to the first service, $N_{k,c}$ represents the number of TBs corresponding to the first service that are received by the UE in each cell and transmitted on a dynamic DL data channel, $N_{y,c}$ represents the number of DCIs corresponding to the first service that are received by the UE in each cell and indicate SPS resource release, $N_{sps,c}$ represents the number of TBs corresponding to the first service that are received by the UE in each cell and transmitted on a semi-persistent DL data channel, and $$N_{cells}^{DL}$$

represents the number of cells corresponding to the PUCCH.

Further, by substituting formula ① and formula ②, the first number of bits of the HARQ feedback information of the first service may also be represented by formula ④:

$$n_{HARQ-ACK,1} = \left( \left( V_{DAI,m_{last}}^{DL} - \sum_{c=0}^{N_{cells}^{DL}-1} U_{DAI,c} \right) mod(2^x) \right) N_{TB,max}^{DL} + \qquad (4)$$

$$\sum_{c=0}^{N_{cells}^{DL}-1} \left( \sum_{m=0}^{M-1} N_{m,c}^{received} + N_{sps,c} \right)$$

502, determine a second number of bits of HARQ feedback information of the second service according to the configuration information and the service information of the second service.

In the embodiments, a method for determining the second number of bits of the HARQ feedback information of the second service according to the configuration information and the service information of the second service is similar to the method for determining the first number of bits of the HARQ feedback information of the first service according to the configuration information and the service information of the first service in step 501, which will not be described in detail herein.

503, obtain a third number of bits according to the first number of bits and the second number of bits.

In the embodiments, the third number of bits is the number of bits of the HARQ feedback information of the PUCCH. Exemplarily, the sum of the first number of bits and the second number of bits may be taken as the third number of bits.

As can be seen, according to the method for determining the number of bits provided in the disclosure, the service information of the first service and the service information of the second service carried in the same PUCCH are obtained. Then the number of bits of the HARQ feedback information of the first service is determined according to the configuration information and the service information of the first service, and the number of bits of the HARQ feedback information of the second service is determined according to the configuration information and the service information of the second service. Finally, the number of bits of the HARQ feedback information carried on the PUCCH is determined according to the number of bits of the HARQ feedback information of the first service and the number of bits of the HARQ feedback information of the second service. As such, it is possible to determine accurately the number of bits of HARQ ACK feedback on the PUCCH for the case where the first service and the second service are multiplexed on the same PUCCH.

The method for determining the number of bits provided in the disclosure will be described in detail below with reference to a specific example.

Referring to FIG. 6, FIG. 6 illustrates transmission by multiplexing an MBS and a unicast service on the same PUCCH. As illustrated in FIG. 6, the PUCCH corresponds to two cells, namely cell 0 and cell 1, $$\text{i.e. } N_{cells}^{DL} = 2.$$

Before transmission or encoding calculation of the PUCCH, for a unicast service, five DCIs are received in total, where three DCIs are received in cell 0 and two DCIs are received in cell 1. Among the five DCIs for the unicast service, four are received by the UE and one is missed due to missed detection, where two are received in cell 0 and one is missed due to missed detection, and two are received in cell 1. One SPS PDSCH transmission for the unicast service is also received in cell 0. For an MBS, three DCIs are received in total, where no DCI is received in cell 0 and three DCIs are received in cell 1. Among the three DCIs for the MBS, two are received by the UE and one is missed due to missed detection, where no DCI is received in cell 0, and two are received in cell 1 and one is missed due to missed detection. One SPS PDSCH transmission for the MBS is also received in cell 1. In addition, according to the configuration information, the maximum number of code words configured via maxNrofCodeWordsScheduledByDCI corresponding to the unicast service is one, and the maximum number of code words configured via maxNrofCodeWordsScheduledByDCI corresponding to the MBS is one. The bit width of a counter DAI field in the DCI for which feedback is performed over the PUCCH is two.

Thus, for the unicast service, the number of bits of HARQ feedback information is:

$$n_{HARQ-ACK,1} = \left( \left( V_{DAI,m_{last}}^{DL} - \sum_{c=0}^{N_{cells}^{DL}-1} U_{DAI,c} \right) mod(2^x) \right) N_{TB,max}^{DL} + \sum_{c=0}^{N_{cells}^{DL}-1} \left( \sum_{m=0}^{M-1} N_{m,c}^{received} + N_{sps,c} \right)$$

$$= \left( (5 - (2+2))mod(2^2) \right) \times 1 + ((2+1) + (2+0))$$

$$= (1 \mod 4) + 5$$

$$= 6$$

For the MBS, the number of bits of HARQ feedback information is:

$$n_{HARQ-ACK,2} = \left(\left(\left(V_{DAI,m_{last}}^{DL} - \sum_{c=0}^{N_{cells}^{DL}-1} U_{DAI,c}\right)\bmod(2^x)\right)N_{TB,max}^{DL} + \sum_{c=0}^{N_{cells}^{DL}-1}\left(\sum_{m-0}^{M-1} N_{m,c}^{received} + N_{sps,c}\right)\right)$$

$$= \left((3 - (0+2))\bmod\left(2^2\right)\right) \times 1 + ((0+0) + (2+1))$$

$$= (1\bmod 4) + 3$$

$$= 4$$

Accordingly, the number of bits of the HARQ feedback information carried on the PUCCH is:

$$n_{HARQ-ACK} = n_{HARQ-ACK,1} + n_{HARQ-ACK,2} = 6+4 = 10$$

As such, the number of bits of the HARQ feedback information carried on the PUCCH can be accurately determined for the case where a unicast service and an MBS are multiplexed on the same PUCCH.

In addition, the disclosure further provides a method for determining a transmission-power adjustment parameter for the PUCCH. Specifically, the transmission-power adjustment parameter may be represented by formula ⑤:

$$\Delta_{TF,b,f,c}(i) = 10\log_{10}\left(K_1(n_{NARQ-ACK}(i) + O_{SR}(i) + O_{CSI}(i))/N_{RE}(i)\right) \quad ⑤$$

$n_{NARQ-ACK}$ (i) is the number of bits of HARQ feedback information corresponding to the PUCCH in transmission occasion i, and the determination method thereof is similar to the method for determining the number of bits of the HARQ feedback information carried on the PUCCH in step 201 to step 202 and will not be described in detail again herein. $O_{SR}(i)$ is the number of scheduling request (SR) information bits determined by the UE in transmission occasion i, $O_{CSI}(i)$ is the number of channel state information (CSI) information bits determined by the UE in transmission occasion i, and $N_{RE}(i)$ is the number of resource elements (REs) in transmission occasion i.

Referring to FIG. 7, FIG. 7 is a block diagram illustrating functional modules of an apparatus for determining the number of bits provided in embodiments of the disclosure. As illustrated in FIG. 7, the apparatus 700 includes a parameter determining module 701 and a processing module 702. The parameter determining module 701 is configured to obtain service information of a first service and service information of a second service, where the first service and the second service are carried in the same PUCCH. The processing module 702 is configured to obtain the number of bits of HARQ feedback information carried on the PUCCH according to configuration information, the service information of the first service, and the service information of the second service, where the configuration information is used for recording a configuration parameter for a channel for transmitting the first service and the second service.

In the embodiments of the disclosure, in terms of obtaining the number of bits of the HARQ feedback information carried on the PUCCH according to the configuration information, the service information of the first service, and the service information of the second service, the processing module 702 is specifically configured to: determine a first number of bits of HARQ feedback information of the first service according to the configuration information and the service information of the first service; determine a second number of bits of HARQ feedback information of the second service according to the configuration information and the service information of the second service; and obtaining a third number of bits according to the first number of bits and the second number of bits, where the third number of bits is the number of bits of the HARQ feedback information of the PUCCH.

In the embodiments of the disclosure, the PUCCH corresponds to one or more cells. Based on this, in terms of obtaining the service information of the first service, the parameter determining module 701 is specifically configured to: obtain a first number of DCIs corresponding to the first service, where feedback regarding each of the DCIs of the first number is performed over the PUCCH; determine a second number of DCIs corresponding to the first service received by a UE, where feedback regarding each of the DCIs of the second number is performed over the PUCCH; determine the number of TBs corresponding to the first service that are received by the UE in each of the one or more cells and transmitted on a dynamic DL data channel; determine the number of DCIs corresponding to the first service that are received by the UE in each cell and indicate SPS resource release; determine the number of TBs corresponding to the first service that are received by the UE in each cell and transmitted on a semi-persistent DL data channel; and take the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent DL data channel as the service information of the first service.

In the embodiments of the disclosure, in terms of determining the first number of bits of the HARQ feedback information of the first service according to the configuration information and the service information of the first service, the processing module 702 is specifically configured to determine, according to the configuration information, a bit width of first indication information of the DCI for which feedback is performed over the PUCCH, and a maximum number of code words of a first configuration, where the first indication information indicates an accumulative number of DCIs received by the UE and having different data contents and/or an accumulative number of DCIs indicating DL SPS resource release. The processing module 702 is further configured to determine the first number of bits of HARQ ACK information of the first service according to the bit width, the maximum number of code words of the first configuration, the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent downlink data channel.

In the embodiments of the disclosure, the first number of bits may be represented by formula ⑥:

$$n_{HARQ-ACK,1} =$$

$$\left(\left(V_{DAI,m_{last}}^{DL} - U_{DAI}\right)\bmod(2^x)\right)N_{TB,max}^{DL} + \sum_{c=0}^{N_{cells}^{DL}-1} (N_{k,c} + N_{y,c} + N_{sps,c})$$

where x is the bit width, $$N_{TB,max}^{DL}$$

is the maximum number of code words, $$V_{DAI,m_{last}}^{DL}$$

is the first number of DCIs corresponding to the first service, $U_{DAI}$ is the second number of DCIs corresponding to the first service, $N_{k,c}$ is the number of TBs corresponding to the first service that are received by the UE in each cell and transmitted on a dynamic DL data channel, $N_{y,c}$ is the number of DCIs corresponding to the first service that are received by the UE in each cell and indicate SPS resource release, $N_{sps,c}$ is the number of TBs corresponding to the first service that are received by the UE in each cell and transmitted on a semi-persistent DL data channel, and $$N_{cells}^{DL}$$

is the number of cells corresponding to the PUCCH.

In the embodiments of the disclosure, the configuration information includes a first source corresponding to the first service, and the first source corresponding to the first service carries the maximum number of code words of the first configuration.

In the embodiments of the disclosure, in terms of obtaining the first number of DCIs corresponding to the first service, the parameter determining module 701 is specifically configured to: obtain all DCIs, where feedback regarding each of all the DCIs is performed over the PUCCH; descramble each of all the DCIs to obtain a first parameter for each of all the DCIs; determine a scrambling parameter for the first service; and select DCIs of the first number corresponding to a first service from all the DCIs, where the first parameter for each of the DCIs of the first number corresponding to the first service is the same as the scrambling parameter.

In the embodiments of the disclosure, the first service is a unicast service. The second service is an MBS.

Referring to FIG. 8, FIG. 8 is a schematic structural diagram of an electronic device provided in embodiments of the disclosure. As illustrated in FIG. 8, the electronic device 800 includes a transceiver 801, a processor 802, and a memory 803 that are coupled via a bus 804. The memory 803 is configured to store computer programs and data, and transmit the data stored in the memory 803 to the processor 802. The processor 802 is configured to read the computer programs in the memory 803 to perform the following operations: obtaining service information of a first service and service information of a second service, where the first service and the second service are carried in the same PUCCH; obtaining the number of bits of HARQ feedback information carried on the PUCCH according to configuration information, the service information of the first service, and the service information of the second service, where the configuration information is used for recording a configuration parameter for a channel for transmitting the first service and the second service.

In the embodiments of the disclosure, in terms of obtaining the number of bits of the HARQ feedback information carried on the PUCCH according to the configuration information, the service information of the first service, and the service information of the second service, the processor 802 is specifically configured to perform the following operations: determining a first number of bits of HARQ feedback information of the first service according to the configuration information and the service information of the first service; determining a second number of bits of HARQ feedback information of the second service according to the configuration information and the service information of the second service; and obtaining a third number of bits according to the first number of bits and the second number of bits, where the third number of bits is the number of bits of the HARQ feedback information of the PUCCH.

In the embodiments of the disclosure, the PUCCH corresponds to one or more cells. Based on this, in terms of obtaining the service information of the first service, the processor 802 is specifically configured to implement the following operations: obtaining a first number of DCIs corresponding to the first service, where feedback regarding each of the DCIs of the first number is performed over the PUCCH; determining a second number of DCIs corresponding to the first service received by a UE, where feedback regarding each of the DCIs of the second number is performed over the PUCCH; determining the number of TBs corresponding to the first service received by the UE in each of the one or more cells and transmitted on a dynamic DL data channel; determining the number of DCIs corresponding to the first service that are received by the UE in each cell and indicate SPS resource release; determining the number of TBs corresponding to the first service that are received by the UE in each cell and transmitted on a semi-persistent DL data channel; and taking the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent DL data channel as the service information of the first service.

In the embodiments of the disclosure, in terms of determining the first number of bits of the HARQ feedback information of the first service according to the configuration information and the service information of the first service, the processor 802 is specifically configured to determine, according to the configuration information, a bit width of first indication information of the DCI for which feedback is performed over the PUCCH, and a maximum number of code words of a first configuration, where the first indication information indicates an accumulative number of DCIs received by the UE and having different data contents and/or an accumulative number of DCIs indicating DL SPS resource release. The processor 802 is further configured to determine the first number of bits of HARQ ACK information of the first service according to the bit width, the maximum number of code words of the first configuration, the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent downlink data channel.

In the embodiments of the disclosure, the first number of bits may be represented by formula ⑦:

$$⑦$$

$$n_{HARQ-ACK,1} =$$

$$\left(\left(V_{DAI,m_{last}}^{DL} - U_{DAI}\right)\bmod(2^x)\right)N_{TB,max}^{DL} + \sum_{c=0}^{N_{cells}^{DL}-1} \left(N_{k,c} + N_{y,c} + N_{sps,c}\right)$$

where x is the bit width, $$N_{TB,max}^{DL}$$

is the maximum number of code words, $$V_{DAI,m_{last}}^{DL}$$

is the first number of DCIs corresponding to the first service, $U_{DAI}$ is the second number of DCIs corresponding to the first service, $N_{k,c}$ is the number of TBs corresponding to the first service that are received by the UE in each cell and transmitted on a dynamic DL data channel, $N_{y,c}$ is the number of DCIs corresponding to the first service that are received by the UE in each cell and indicate SPS resource release, $N_{sps,c}$ is the number of TBs corresponding to the first service that are received by the UE in each cell and transmitted on a semi-persistent DL data channel, and $$N_{cells}^{DL}$$

is the number of cells corresponding to the PUCCH.

In the embodiments of the disclosure, the configuration information includes a first source corresponding to the first service, and the first source corresponding to the first service carries the maximum number of code words of the first configuration.

In the embodiments of the disclosure, in terms of obtaining the first number of DCIs corresponding to the first service, the processor 802 is specifically configured to implement the following operations: obtaining all DCIs, where feedback regarding each of all the DCIs is performed over the PUCCH; descrambling each of all the DCIs to obtain a first parameter for each of all the DCIs; determining a scrambling parameter for the first service; and selecting DCIs of the first number corresponding to the first service from all the DCIs, where the first parameter for each of the DCIs of the first number corresponding to the first service is the same as the scrambling parameter.

In the embodiments of the disclosure, the first service is a unicast service. The second service is an MBS.

Embodiments of the disclosure further provide a chip. The chip may also be included in a chip module. Specifically, the chip is configured to: obtain service information of a first service and service information of a second service, where the first service and the second service are carried in the same PUCCH; and obtain the number of bits of HARQ feedback information carried on the PUCCH according to configuration information, the service information of the first service, and the service information of the second service, where the configuration information is used for recording a configuration parameter for a channel for transmitting the first service and the second service.

In the embodiments of the disclosure, in terms of obtaining the number of bits of the HARQ feedback information carried on the PUCCH according to the configuration information, the service information of the first service, and the service information of the second service, the chip is specifically configured to implement the following operations: determining a first number of bits of HARQ feedback information of the first service according to the configuration information and the service information of the first service; determining a second number of bits of HARQ feedback information of the second service according to the configuration information and the service information of the second service; and obtaining a third number of bits according to the first number of bits and the second number of bits, where the third number of bits is the number of bits of the HARQ feedback information of the PUCCH.

In the embodiments of the disclosure, the PUCCH corresponds to one or more cells. Based on this, in terms of obtaining the service information of the first service, the chip is specifically configured to implement the following operations: obtaining a first number of DCIs corresponding to the first service, where feedback regarding each of the DCIs of the first number is performed over the PUCCH; determining a second number of DCIs corresponding to the first service received by a UE, where feedback regarding each of the DCIs of the second number is performed over the PUCCH; determining the number of TBs corresponding to the first service received by the UE in each of the one or more cells and transmitted on a dynamic DL data channel; determining the number of DCIs corresponding to the first service that are received by the UE in each cell and indicate SPS resource release; determining the number of TBs corresponding to the first service that are received by the UE in each cell and transmitted on a semi-persistent DL data channel; and taking the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent DL data channel as the service information of the first service.

In the embodiments of the disclosure, in terms of determining the first number of bits of the HARQ feedback information of the first service according to the configuration information and the service information of the first service, the chip is specifically configured to determine, according to the configuration information, a bit width of first indication information of the DCI for which feedback is performed over the PUCCH, and a maximum number of code words of a first configuration, where the first indication information indicates an accumulative number of DCIs received by the UE and having different data contents and/or an accumulative number of DCIs indicating DL SPS resource release. The chip is further configured to determine the first number of bits of HARQ ACK information of the first service according to the bit width, the maximum number of code words of the first configuration, the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent downlink data channel.

In the embodiments of the disclosure, the first number of bits may be represented by formula ⑧:

$$
n_{HARQ-ACK,1} =
$$

$$
\left( \left( V_{DAI,m_{last}}^{DL} - U_{DAI} \right) \bmod(2^x) \right) N_{TB,\max}^{DL} + \sum_{c=0}^{N_{cells}^{DL}-1} (N_{k,c} + N_{y,c} + N_{sps,c})
$$

where x is the bit width, $$
N_{TB,\max}^{DL}
$$

is the maximum number of code words, $$
V_{DAI,m_{last}}^{DL}
$$

is the first number of DCIs corresponding to the first service, $U_{DAI}$ is the second number of DCIs corresponding to the first service, $N_{k,c}$ is the number of TBs corresponding to the first service that are received by the UE in each cell and transmitted on a dynamic DL data channel, $N_{y,c}$ is the number of DCIs corresponding to the first service that are received by the UE in each cell and indicate SPS resource release, $N_{sps,c}$ is the number of TBs corresponding to the first service that are received by the UE in each cell and transmitted on a semi-persistent DL data channel, and $$
N_{cells}^{DL}
$$

is the number of cells corresponding to the PUCCH.

In the embodiments of the disclosure, the configuration information includes a first source corresponding to the first service, and the first source corresponding to the first service carries the maximum number of code words of the first configuration.

In the embodiments of the disclosure, in terms of obtaining the first number of DCIs corresponding to the first service, the chip is specifically configured to perform the following operations: obtaining all DCIs, where feedback regarding each of all the DCIs is performed over the PUCCH; descrambling each of all the DCIs to obtain a first parameter for each of all the DCIs; determining a scrambling parameter for the first service; and selecting DCIs of the first number corresponding to the first service from all the DCIs, where the first parameter for each of the DCIs of the first number corresponding to the first service is the same as the scrambling parameter.

In the embodiments of the disclosure, the first service is a unicast service. The second service is an MBS.

Figure 9:
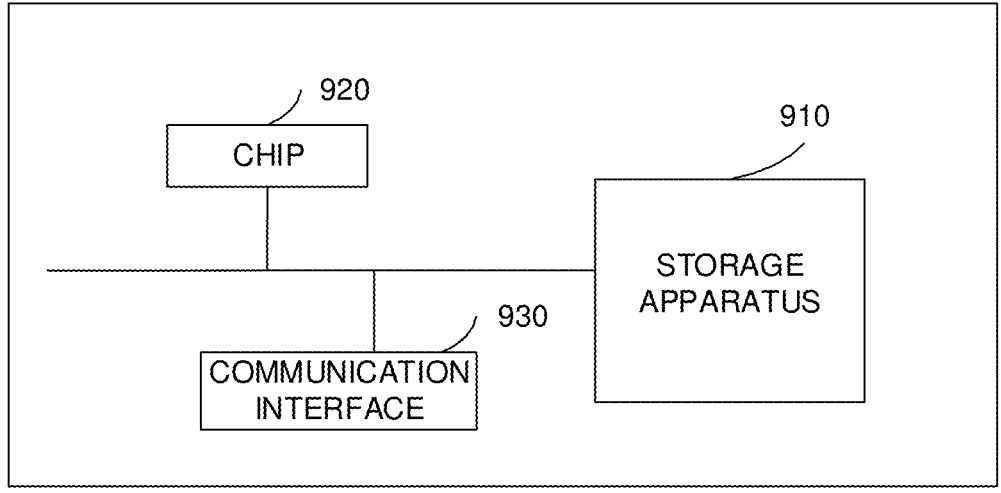
FIG. 9 is a simplified schematic diagram of a chip module provided in embodiments of the disclosure.

Referring to FIG. 9, FIG. 9 is a simplified schematic diagram of a chip module provided in embodiments of the disclosure. The chip module includes a storage apparatus 910, a chip 920, and a communication interface 930. The chip 920 is configured to: obtain service information of a first service and service information of a second service, where the first service and the second service are carried in the same PUCCH; and obtain the number of bits of HARQ feedback information carried on the PUCCH according to configuration information, the service information of the first service, and the service information of the second service, where the configuration information is used for recording a configuration parameter for a channel for transmitting the first service and the second service.

In the embodiments of the disclosure, in terms of obtaining the number of bits of the HARQ feedback information carried on the PUCCH according to the configuration information, the service information of the first service, and the service information of the second service, the chip 920 is specifically configured to implement the following operations: determining a first number of bits of HARQ feedback information of the first service according to the configuration information and the service information of the first service; determining a second number of bits of HARQ feedback information of the second service according to the configuration information and the service information of the second service; and obtaining a third number of bits according to the first number of bits and the second number of bits, where the third number of bits is the number of bits of the HARQ feedback information of the PUCCH.

In the embodiments of the disclosure, the PUCCH corresponds to one or more cells. Based on this, in terms of obtaining the service information of the first service, the chip 920 is specifically configured to implement the following operations: obtaining a first number of DCIs corresponding to the first service, where feedback regarding each of the DCIs of the first number is performed over the PUCCH; determining a second number of DCIs corresponding to the first service received by a UE, where feedback regarding each of the DCIs of the second number is performed over the PUCCH; determining the number of TBs corresponding to the first service received by the UE in each of the one or more cells and transmitted on a dynamic DL data channel; determining the number of DCIs corresponding to the first service that are received by the UE in each cell and indicate SPS resource release; determining the number of TBs corresponding to the first service that are received by the UE in each cell and transmitted on a semi-persistent DL data channel; and taking the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent DL data channel as the service information of the first service.

In the embodiments of the disclosure, in terms of determining the first number of bits of the HARQ feedback information of the first service according to the configuration information and the service information of the first service, the chip 920 is specifically configured to determine, according to the configuration information, a bit width of first indication information of the DCI for which feedback is performed over the PUCCH, and a maximum number of code words of a first configuration, where the first indication information indicates an accumulative number of DCIs received by the UE and having different data contents and/or an accumulative number of DCIs indicating DL SPS resource release. The chip 920 is further configured to determine the first number of bits of HARQ ACK information of the first service according to the bit width, the maximum number of code words of the first configuration, the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent downlink data channel.

In the embodiments of the disclosure, the first number of bits may be represented by formula ⑨:

$$n_{HARQ-ACK,1} =$$

$$\left( \left( V_{DAI,m_{last}}^{DL} - U_{DAI} \right) \bmod (2^x) \right) N_{TB,max}^{DL} + \sum_{c=0}^{N_{cells}^{DL}-1} (N_{k,c} + N_{y,c} + N_{sps,c})$$

⑨ where x is the bit width, $$N_{TB,max}^{DL}$$

is the maximum number of code words, $$V_{DAI,m_{last}}^{DL}$$

is the first number of DCIs corresponding to the first service, $U_{DAI}$ is the second number of DCIs corresponding to the first service, $N_{k,c}$ is the number of TBs corresponding to the first service that are received by the UE in each cell and transmitted on a dynamic DL data channel, $N_{y,c}$ is the number of DCIs corresponding to the first service that are received by the UE in each cell and indicate SPS resource release, $N_{sps,c}$ is the number of TBs corresponding to the first service that are received by the UE in each cell and transmitted on a semi-persistent DL data channel, and $$N_{cells}^{DL}$$

is the number of cells corresponding to the PUCCH.

In the embodiments of the disclosure, the configuration information includes a first source corresponding to the first service, and the first source corresponding to the first service carries the maximum number of code words of the first configuration.

In the embodiments of the disclosure, in terms of obtaining the first number of DCIs corresponding to the first service, the chip 920 is specifically configured to perform the following operations: obtaining all DCIs, where feedback regarding each of all the DCIs is performed over the PUCCH; descrambling each of all the DCIs to obtain a first parameter for each of all the DCIs; determining a scrambling parameter for the first service; and selecting DCIs of the first number corresponding to the first service from all the DCIs, where the first parameter for each of the DCIs of the first number corresponding to the first service is the same as the scrambling parameter.

In the embodiments of the disclosure, the first service is a unicast service. The second service is an MBS.

It should be understood that, the apparatus for determining the number of bits in the disclosure may include a smartphone (for example, an Android mobile phone, an iOS mobile phone, or a Windows Phone mobile phone), a tablet computer, a palmtop, a notebook computer, a mobile Internet device (MID), a robot, or a wearable device. The foregoing apparatus for determining the number of bits is only exemplary rather than exhaustive, and includes but is not limited to the foregoing apparatus for determining the number of bits. In practice, the foregoing apparatus for determining the number of bits may further include: a smart in-vehicle terminal, a computer device, etc.

According to the illustration of the foregoing embodiments, those skilled in the art can understand clearly that the disclosure may be implemented by software in combination with a hardware platform. Based on such an understanding, all or some of the technical solutions of the disclosure that contribute to the related art may be implemented in the form of a software product, The computer software product may be stored in a storage medium, such as a read-only memory (ROM)/random-access memory (RAM), a magnetic disk, or an optical disc, and includes several instructions for causing a computer device (which may be a personal computer, a server, a network device, or the like) to perform the methods described in the embodiments of the disclosure or some parts in the embodiments.

Therefore, embodiments of the disclosure further provide a computer-readable storage medium. The computer-readable storage medium is configured to store computer programs. The computer programs, when executed by a processor, are operable to implement some or all of the steps of any method for determining the number of bits described in the foregoing method embodiments. For example, the storage medium may include a hard drive, a floppy disk, an optical disk, a magnetic tape, a magnetic disk, a universal serial bus (USB) flash disk, a flash memory, etc.

Embodiments of the disclosure further provide a computer program product. The computer program product includes a non-transitory computer-readable storage medium storing computer programs. The computer programs are operable with a computer to implement some or all of the steps of any method for determining the number of bits described in the described method embodiments.

It should be noted that, for the sake of brevity, the foregoing method embodiments are described as a series of action combinations. However, it will be appreciated by those skilled in the art that the disclosure not limited by the sequence of actions described. According to the disclosure, some steps may be performed in other orders or simultaneously. Besides, it will be appreciated by those skilled in the art that the embodiments described in the specification are optional implementations, and the actions and modules involved are not necessarily essential to the disclosure.

In the foregoing embodiments, the elaboration of each embodiment has its own emphasis. For part not described in detail in one embodiment, reference can be made to the relevant illustration in other embodiments.

It should be understood that, the apparatus disclosed in the embodiments provided in the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, apparatus, or unit, and may be electrical or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various embodiments of the disclosure may be integrated into one processing unit or may be present as a number of physically separated units, and two or more units may be integrated into one. The integrated unit may be implemented in the form of hardware, or may be implemented in the form of software program module.

If the integrated unit is implemented in the form of software program module and sold or used as a standalone product, the integrated unit may be stored in a computer-readable memory. Based on such an understanding, the essential technical solution, or the portion that contributes to the related art, or part of the technical solution of the disclosure may be embodied as software products. The computer software product can be stored in a memory and may include multiple instructions that, when executed, can cause a computer device, e.g., a personal computer, a server, a network device, etc., to execute some or all operations of the methods described in various embodiments of the disclosure. The above memory may include various kinds of media that can store program codes, such as a USB flash disk, a ROM, a RAM, a mobile hard drive, a magnetic disk, or an optical disk.

Those of ordinary skill in the art should understand that all or some of the steps of the methods in the foregoing embodiments may be implemented by programs instructing relevant hardware. The programs may be stored in a computer readable memory, and the memory may include a flash memory disk, a ROM, a RAM, a magnetic disk, or an optical disk.

The embodiments of the disclosure are described in detail above, and the principle and implementation of the disclosure are elaborated with reference to specific examples. The elaboration of the foregoing embodiments is only intended for facilitating understanding of the method and the core idea of the disclosure. In addition, those skilled in the art may make modifications to the specific implementation and application scope according to the idea of the disclosure. Therefore, the content of the specification shall not be construed as limitation to the disclosure.

We claim:

1. A method for determining a number of bits, comprising:
obtaining service information of a first service and service information of a second service, wherein the first service and the second service are carried in the same physical uplink control channel (PUCCH); and
obtaining a number of bits of hybrid automatic repeat request (HARQ) feedback information of the PUCCH according to configuration information, the service information of the first service, and the service information of the second service, wherein the configuration information is used for recording a configuration parameter for a channel for transmitting the first service and the second service;
wherein the number of bits of the HARQ feedback information of the PUCCH is determined according to a first number of bits of HARQ feedback information of the first service and a second number of bits of HARQ feedback information of the second service.

2. The method of claim 1, wherein obtaining the number of bits of the HARQ feedback information carried on the PUCCH according to the configuration information, the service information of the first service, and the service information of the second service comprises:
determining the first number of bits of HARQ feedback information of the first service according to the configuration information and the service information of the first service;
determining the second number of bits of HARQ feedback information of the second service according to the configuration information and the service information of the second service; and
obtaining a third number of bits according to the first number of bits and the second number of bits, wherein the third number of bits is the number of bits of the HARQ feedback information of the PUCCH.

3. The method of claim 2, wherein the PUCCH corresponds to one or more cells, and obtaining the service information of the first service comprises:
obtaining a first number of downlink control information (DCIs) corresponding to the first service, wherein feedback regarding each of the DCIs of the first number is performed over the PUCCH;
determining a second number of DCIs corresponding to the first service received by a user equipment (UE), wherein feedback regarding each of the DCIs of the second number is performed over the PUCCH;
determining the number of transport blocks (TBs) corresponding to the first service that are received by the UE in each of the one or more cells and transmitted on a dynamic downlink (DL) data channel;
determining the number of DCIs corresponding to the first service that are received by the UE in each cell and indicate semi-persistent scheduling (SPS) resource release;

determining the number of TBs corresponding to the first service that are received by the UE in each cell and transmitted on a semi-persistent DL data channel; and taking the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent DL data channel as the service information of the first service.

4. The method of claim 3, wherein determining the first number of bits of the HARQ feedback information of the first service according to the configuration information and the service information of the first service comprises:

determining, according to the configuration information, a bit width of first indication information of the DCI for which feedback is performed over the PUCCH and a maximum number of code words of a first configuration, wherein the first indication information indicates an accumulative number of DCIs received by the UE and having different data contents and/or an accumulative number of DCIs indicating DL SPS resource release; and determining the first number of bits of HARQ acknowledgement (ACK) information of the first service according to the bit width, the maximum number of code words of the first configuration, the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent downlink data channel.

5. The method of claim 4, wherein the first number of bits satisfies the following formula:

$$n_{HARQ-ACK,1} =$$

$$\left(\left(V_{DAI,m_{last}}^{DL} - U_{DAI}\right)\bmod(2^x)\right)N_{TB,max}^{DL} + \sum_{c=0}^{N_{cells}^{DL}-1}(N_{k,c} + N_{y,c} + N_{sps,c})$$

wherein x is the bit width, $$N_{TB,max}^{DL}$$

is the maximum number of code words, $$V_{DAI,m_{last}}^{DL}$$

is the first number of DCIs corresponding to the first service, $U_{DAI}$ is the second number of DCIs corresponding to the first service, $N_{k,c}$ is the number of TBs corresponding to the first service that are received by the UE in each cell and transmitted on a dynamic DL data channel, $N_{y,c}$ is the number of DCIs corresponding to the first service that are received by the UE in each cell and indicate SPS resource release, $N_{sps,c}$ is the number of TBs corresponding to the first service that are received by the UE in each cell and transmitted on a semi-persistent DL data channel, and $$N_{cells}^{DL}$$

is the number of cells corresponding to the PUCCH.

6. The method of claim 4, wherein the configuration information comprises a first source corresponding to the first service, and the first source corresponding to the first service carries the maximum number of code words of the first configuration.

7. The method of claim 2, wherein obtaining the first number of DCIs corresponding to the first service comprises:

obtaining all DCIs, wherein feedback regarding each of all the DCIs is performed over the PUCCH;

descrambling each of all the DCIs to obtain a first parameter for each of all the DCIs;

determining a scrambling parameter for the first service; and selecting DCIs of the first number corresponding to the first service from all the DCIs, wherein the first parameter for each of the DCIs of the first number corresponding to the first service is the same as the scrambling parameter.

8. The method of claim 1, wherein the first service is a unicast service, and the second service is a multicast or broadcast service (MBS).

9. An electronic device, comprising a processor, a memory, a communication interface, and one or more programs, wherein the one or more programs are stored in the memory and configured to be executed by the processor to cause the processor to:

obtain service information of a first service and service information of a second service, wherein the first service and the second service are carried in the same physical uplink control channel (PUCCH); and obtain a number of bits of hybrid automatic repeat request (HARQ) feedback information of the PUCCH according to configuration information, the service information of the first service, and the service information of the second service, wherein the configuration information is used for recording a configuration parameter for a channel for transmitting the first service and the second service;

wherein the number of bits of the HARQ feedback information of the PUCCH is determined according to a first number of bits of HARQ feedback information of the first service and a second number of bits of HARQ feedback information of the second service.

10. The electronic device of claim 9, wherein the processor configured to obtain the number of bits of the HARQ feedback information carried on the PUCCH according to the configuration information, the service information of the first service, and the service information of the second service is configured to:

determine the first number of bits of HARQ feedback information of the first service according to the configuration information and the service information of the first service;

determine the second number of bits of HARQ feedback information of the second service according to the configuration information and the service information of the second service; and obtain a third number of bits according to the first number of bits and the second number of bits, wherein the third number of bits is the number of bits of the HARQ feedback information of the PUCCH.

11. The electronic device of claim 10, wherein the PUCCH corresponds to one or more cells, and the processor configured to obtain the service information of the first service is specifically configured to:

obtain a first number of downlink control information (DCIs) corresponding to the first service, wherein feedback regarding each of the DCIs of the first number is performed over the PUCCH;

determine a second number of DCIs corresponding to the first service received by a user equipment (UE), wherein feedback regarding each of the DCIs of the second number is performed over the PUCCH;

determine the number of transport blocks (TBs) corresponding to the first service that are received by the UE in each of the one or more cells and transmitted on a dynamic downlink (DL) data channel;

determine the number of DCIs corresponding to the first service that are received by the UE in each cell and indicate semi-persistent scheduling (SPS) resource release;

determine the number of TBs corresponding to the first service that are received by the UE in each cell and transmitted on a semi-persistent DL data channel; and take the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent DL data channel as the service information of the first service.

12. The electronic device of claim 11, wherein the processor configured to determine the first number of bits of the HARQ feedback information of the first service according to the configuration information and the service information of the first service is specifically configured to:

determine, according to the configuration information, a bit width of first indication information of the DCI for which feedback is performed over the PUCCH, and a maximum number of code words of a first configuration, wherein the first indication information indicates an accumulative number of DCIs received by the UE and having different data contents and/or an accumulative number of DCIs indicating DL SPS resource release; and determine the first number of bits of HARQ acknowledgement (ACK) information of the first service according to the bit width, the maximum number of code words of the first configuration, the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent downlink data channel.

13. The electronic device of claim 12, wherein the first number of bits satisfies the following formula:

$$n_{HARQ-ACK,1} =$$

$$((V_{DAI,m_{last}}^{DL} - U_{DAI})\mathrm{mod}(2^x))N_{TB,max}^{DL} + \sum_{c=0}^{N_{cells}^{DL}-1} (N_{k,c} + N_{y,c} + N_{sps,c})$$

wherein x is the bit width, $$N_{TB,max}^{DL}$$

is the maximum number of code words, $$V_{DAI,m_{last}}^{DL}$$

is the first number of DCIs corresponding to the first service, $U_{DAI}$ is the second number of DCIs corresponding to the first service, $N_{k,c}$ is the number of TBs corresponding to the first service that are received by the UE in each cell and transmitted on a dynamic DL data channel, $N_{y,c}$ is the number of DCIs corresponding to the first service that are received by the UE in each cell and indicate SPS resource release, $N_{sps,c}$ is the number of TBs corresponding to the first service that are received by the UE in each cell and transmitted on a semi-persistent DL data channel, and $$N_{cells}^{DL}$$

is the number of cells corresponding to the PUCCH.

14. The electronic device of claim 13, wherein the configuration information comprises a first source corresponding to the first service, and the first source corresponding to the first service carries the maximum number of code words of the first configuration.

15. The electronic device of claim 10, wherein the processor configured to obtain the first number of DCIs corresponding to the first service is specifically configured to:

obtain all DCIs, wherein feedback regarding each of all the DCIs is performed over the PUCCH;

descramble each of all the DCIs to obtain a first parameter for each of all the DCIs;

determine a scrambling parameter for the first service; and select DCIs of the first number corresponding to the first service from all the DCIs, wherein the first parameter for each of the DCIs of the first number corresponding to the first service is the same as the scrambling parameter.

16. The electronic device of claim 9, wherein the first service is a unicast service;

the second service is a multicast or broadcast service (MBS).

17. A non-transitory computer-readable storage medium configured to store computer programs which, when executed by a processor, are operable to implement:

obtaining service information of a first service and service information of a second service, wherein the first service and the second service are carried in the same physical uplink control channel (PUCCH); and obtaining a number of bits of hybrid automatic repeat request (HARQ) feedback information of the PUCCH according to configuration information, the service information of the first service, and the service information of the second service, wherein the configuration information is used for recording a configuration parameter for a channel for transmitting the first service and the second service;

wherein the number of bits of the HARQ feedback information of the PUCCH is determined according to a first number of bits of HARQ feedback information of the first service and a second number of bits of HARQ feedback information of the second service.

18. The non-transitory computer-readable storage medium of claim 17, wherein obtaining the number of bits of the HARQ feedback information carried on the PUCCH according to the configuration information, the service information of the first service, and the service information of the second service comprises:

determining the first number of bits of HARQ feedback information of the first service according to the configuration information and the service information of the first service;

determining the second number of bits of HARQ feedback information of the second service according to the configuration information and the service information of the second service; and obtaining a third number of bits according to the first number of bits and the second number of bits, wherein the third number of bits is the number of bits of the HARQ feedback information of the PUCCH.

19. The non-transitory computer-readable storage medium of claim 18, wherein the PUCCH corresponds to one or more cells, and obtaining the service information of the first service comprises:

obtaining a first number of downlink control information (DCIs) corresponding to the first service, wherein feedback regarding each of the DCIs of the first number is performed over the PUCCH;

determining a second number of DCIs corresponding to the first service received by a user equipment (UE), wherein feedback regarding each of the DCIs of the second number is performed over the PUCCH;

determining the number of transport blocks (TBs) corresponding to the first service that are received by the UE in each of the one or more cells and transmitted on a dynamic downlink (DL) data channel;

determining the number of DCIs corresponding to the first service that are received by the UE in each cell and indicate semi-persistent scheduling (SPS) resource release;

determining the number of TBs corresponding to the first service that are received by the UE in each cell and transmitted on a semi-persistent DL data channel; and taking the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent DL data channel as the service information of the first service.

20. The non-transitory computer-readable storage medium of claim 19, wherein determining the first number of bits of the HARQ feedback information of the first service according to the configuration information and the service information of the first service comprises:

determining, according to the configuration information, a bit width of first indication information of the DCI for which feedback is performed over the PUCCH and a maximum number of code words of a first configuration, wherein the first indication information indicates an accumulative number of DCIs received by the UE and having different data contents and/or an accumulative number of DCIs indicating DL SPS resource release; and determining the first number of bits of HARQ acknowledgement (ACK) information of the first service according to the bit width, the maximum number of code words of the first configuration, the first number of DCIs corresponding to the first service, the second number of DCIs corresponding to the first service, the number of TBs corresponding to the first service that are received by the UE in each cell and transmitted on a dynamic DL data channel, the number of DCIs corresponding to the first service that are received by the UE in each cell and indicate SPS resource release, and the number of TBs corresponding to the first service that are received by the UE in each cell and transmitted on a semi-persistent downlink data channel.

* * * * *